United States Patent
Van Oers et al.

(10) Patent No.: US 12,077,974 B2
(45) Date of Patent: Sep. 3, 2024

(54) SCAFFOLDING, COUPLING DEVICE AND METHOD FOR ERECTING A SCAFFOLDING

(71) Applicant: Brand Infrastructure Services B.V., Vlaardingen (NL)

(72) Inventors: Petrus Christianus Johannus Maria Van Oers, Nuenen (NL); Antonius Johannus Marinus Van Leent, Tilburg (NL); Ralph Gerardus Franciscus Herman Kweens, Boxtel (NL)

(73) Assignee: Brand Infrastructure Services B.V., Vlaardingen (NL)

( * ) Notice: Subject to any disclaimer, the term of this patent is extended or adjusted under 35 U.S.C. 154(b) by 1002 days.

(21) Appl. No.: 16/967,078

(22) PCT Filed: Jan. 31, 2019

(86) PCT No.: PCT/NL2019/050065
§ 371 (c)(1),
(2) Date: Aug. 3, 2020

(87) PCT Pub. No.: WO2019/151862
PCT Pub. Date: Aug. 8, 2019

(65) Prior Publication Data
US 2021/0032885 A1    Feb. 4, 2021

(30) Foreign Application Priority Data
Feb. 2, 2018    (NL) ...................................... 2020375

(51) Int. Cl.
*E04G 5/14*    (2006.01)
*E04G 7/22*    (2006.01)
(Continued)

(52) U.S. Cl.
CPC ............... *E04G 5/147* (2013.01); *E04G 7/22* (2013.01); *E04G 5/007* (2013.01); *E04G 7/32* (2013.01); *E04G 7/34* (2013.01)

(58) Field of Classification Search
CPC ........... E04G 5/147; E04G 5/007; E04G 7/22; E04G 7/32; E04G 7/34; E04G 7/046; E04G 7/14; E04G 7/02; E04G 7/12; E04G 7/24
See application file for complete search history.

(56) References Cited

U.S. PATENT DOCUMENTS 8,979,413 B2    3/2015  Brinkmann
2012/0186911 A1 *  7/2012  Thacker ................. E04G 7/32
                                                    182/186.8
(Continued)

FOREIGN PATENT DOCUMENTS

CN    106437136 A  *  2/2017 ............... E04G 7/06
CN    112443157 A  *  3/2021
(Continued)

*Primary Examiner* — Jerry E Redman
(74) *Attorney, Agent, or Firm* — Foley & Lardner LLP (57) ABSTRACT

Scaffolding, coupling device and method for erecting a scaffolding During erection of a scaffolding use is made of a coupling device with a base part (20) which is connected temporarily, but reliably, to a distal section of a ledger element (10) and to a coupling part (30) extending from the base part (20). The coupling part (30) comprises at the outer end a hook (35) which is placed round a subsequent upright (5) of the scaffolding in order to thus make a secondary connection thereto, while a primary connection (9,11) between the ledger (10) and the upright (5) is only completed later.

6 Claims, 6 Drawing Sheets

(51) Int. Cl.
 *E04G 5/00* (2006.01)
 *E04G 7/32* (2006.01)
 *E04G 7/34* (2006.01)

(56) References Cited

U.S. PATENT DOCUMENTS

| | | | |
|---|---|---|---|
| 2016/0251864 A1* | 9/2016 | Hayman | E04G 5/061 |
| | | | 403/246 |
| 2018/0274249 A1* | 9/2018 | Hayman | E04G 7/308 |
| 2021/0032885 A1* | 2/2021 | Van Oers | E04G 7/14 |

FOREIGN PATENT DOCUMENTS

| | | | | |
|---|---|---|---|---|
| CN | 115538762 A | * | 12/2022 | |
| DE | 102021107053 A1 | * | 9/2022 | ............... E04G 1/15 |
| FR | 2516141 A1 | | 5/1983 | |
| GB | 2599459 A | * | 4/2022 | ............... E04G 7/12 |
| JP | 2005068650 A | | 3/2005 | |
| NL | 6400346 A | | 7/1964 | |
| NL | 2004011 C2 | | 6/2011 | |
| NL | 2005333 C | * | 3/2012 | ............... E04G 1/12 |
| WO | 0166879 A1 | | 9/2001 | |
| WO | WO-2015099524 A1 | * | 7/2015 | ............. E04G 7/14 |
| WO | WO-2019151862 A1 | * | 8/2019 | ............. E04G 5/007 |

\* cited by examiner

SCAFFOLDING, COUPLING DEVICE AND METHOD FOR ERECTING A SCAFFOLDING

CROSS-REFERENCE TO RELATED PATENT APPLICATIONS

This application is a U.S. national stage of and claims the benefit of and priority to International Application No. PCT/NL2019/050065, filed Jan. 31, 2019, which claims the benefit of and priority to Netherlands Application No. NL2020375, filed Feb. 2, 2018, both of which are incorporated herein by reference in their entirety and for all purposes.

TECHNICAL FIELD

The present invention relates to a scaffolding comprising a system of upright elements and ledger elements, which ledger elements extend at least substantially in a transverse direction between successive upright elements, wherein the ledger elements are provided at opposite outer ends with coupling means for a primary coupling to coupling means corresponding thereto on the upright elements.

The invention also relates to a method for erecting a scaffolding, comprising of placing a system of successive upright elements and intermediate ledger elements, which ledger elements are provided at opposite outer ends with first coupling members and which upright elements are provided, distributed along a length thereof, with second coupling members corresponding thereto, wherein a ledger element is arranged at height between a first upright element and a subsequent second upright element by means of a first primary coupling between a first and second coupling member at a distal end of the ledger element and a second primary coupling between a first and second coupling member at a proximal end of the ledger element.

BACKGROUND

Scaffoldings are in general mainly known as temporary support structure for operations at height on a building or installation. The scaffolding is normally assembled here from uprights and ledgers in the form of elongate tube bodies, usually of steel or aluminium, which together form a system of successive scaffold sections. The uprights are applied in erected position while the ledgers are attached therebetween and intended and configured to support a scaffold floor or to form a safe railing. A scaffolding is erected by means of quick-connect couplings by means of primary coupling means between on the one hand coupling members provided for the purpose on the outer ends of the ledgers and on the other matching coupling members at regular spacing on the uprights.

The purpose of a scaffolding is to allow safe working at height. The scaffolding must for this purpose comply with various safety standards and be anchored reliably to the 'fixed world'. Once it has been erected, work can be carried out safely and responsibly from the scaffold sections. Each section is preferably provided here with a railing as (additional) fall protection to which a fall protection harness can if desired be secured.

Although the scaffolding ultimately provides a reliable and safe working environment at height, this is not yet the case for those who have to erect the scaffolding itself. It is inevitably also necessary to work at height for this purpose, while for each successive layer of the scaffolding a railing or the like is not yet present to which it is possible to be secured.

SUMMARY

The present invention has for its object, among others, to provide a scaffolding which not only provides a safe working environment after it has been erected but which can already be constructed in a safe and responsible manner while it is also being erected.

In order to achieve the stated object a scaffolding of the type described in the preamble has the feature according to the invention that at least one of the ledger elements is provided at a distal end with a releasable coupling device comprising a base part which is connected releasably to a body part of the ledger element and comprising a coupling part with a coupling member which extends from the base part and which is able and configured to engage on the subsequent upright element in order to make a secondary coupling therewith. The coupling device here provides a temporary attachment which can be made before the more permanent primary connection is brought about. This temporary, secondary attachment does however already provide a possibility for reliable securing thereto when the primary connection is subsequently realized, while unsafe work at height is not necessary for this purpose. This therefore also ensures safety during the erection of the scaffolding for the workers involved.

A preferred embodiment of the scaffolding according to the invention in which the coupling device has proven extremely practical and effective has the feature that the coupling device comprises a hook device, wherein a hook part which engages with a hook member round a body part of the subsequent upright element extends from the base part.

In a particular embodiment the scaffolding according to the invention has the feature that the base part comprises a set of mutually pivoting parts which can be manipulated manually from an open state to a mutually closed state, in which closed state the body part of the ledger element lies enclosed there between. The mutually pivoting shell parts of the coupling device here provide an exceptionally practical and simple method of temporarily joining together the coupling device and the ledger element. A particular embodiment of the scaffolding according to the invention has the feature here that the base part comprises a shell part in which the body part of the ledger element is receivable in at least substantially fitting manner, and that a latch is connected pivotally to the shell part and closes over the body part of the ledger element on a side remote from the shell part.

For a superior securing a preferred embodiment of the scaffolding according to the invention has the feature here that the latch is provided with closing means which lock the latch in a closed state. Once the base part of the coupling device is thus closed and locked round the ledger element, the ledger element is brought into engagement with the subsequent upright element using the coupling member. The proximal primary coupling is subsequently effected. In this situation the ledger element lies enclosed between the two successive upright elements and is thus fixed therebetween. This can be wholly realized from the proximal side, which side already has a primary connection and so always provides the possibility of reliable securing.

For the purpose of a correct placing of the coupling device on the ledger element a further preferred embodiment of the scaffolding according to the invention has the feature that the coupling device comprises fixation means which impose a predetermined relative orientation and position on the coupling device and the ledger element. These fixation means particularly comprise a protrusion which extends from the coupling device and which is received fittingly by a corresponding recess, cavity or opening which extends from the ledger element so that a predetermined orientation and position is obtained therebetween.

In line herewith a method of the type described in the preamble for erecting a scaffolding according to the invention has the feature that, before the ledger element is arranged, the ledger element is provided at the distal end with a releasable coupling device comprising a base part which is connected releasably to a body part of the ledger element and comprising a coupling part with a third coupling member which extends from the base part, that the ledger element is coupled with the third coupling member of the coupling device to the upright element and a secondary coupling is thereby realized, that the first primary coupling and the second primary coupling are successively realized, and that the secondary coupling is subsequently broken and the coupling device is removed and, if desired, then used for a subsequent ledger element.

For the purpose of continuous safety the method according to the invention has the feature in a preferred embodiment that the first and second primary coupling are locked before the secondary coupling is broken. The secondary coupling is thus only broken after the primary coupling has been locked and secured on both sides. The ledger element that has just been arranged now itself already provides sufficient safety, i.e. also without the secondary coupling, so that the secondary coupling can be removed without compromising safety.

In order to avoid the secondary coupling detaching unexpectedly before the primary coupling between the ledger element and the two adjacent upright elements has been fully brought about and secured, a further preferred embodiment of the method according to the invention has the feature that the coupling device is laid round a body part of the ledger element, whereby the body part becomes enclosed therein, and that the coupling device is locked in this state.

BRIEF DESCRIPTION OF THE DRAWINGS

The invention also relates to a coupling device of the type and configuration as applied in the above described scaffolding and the above specified method according to the invention, and will be further elucidated hereinbelow on the basis of an exemplary embodiment and an accompanying drawing. In the drawings.

It is otherwise noted here that the figures are purely schematic and not always drawn to (the same) scale. For the sake of clarity some dimensions in particular may be exaggerated to a greater or lesser extent. Corresponding parts are designated in the figures with the same reference numeral.

DETAILED DESCRIPTION

Figure 1:
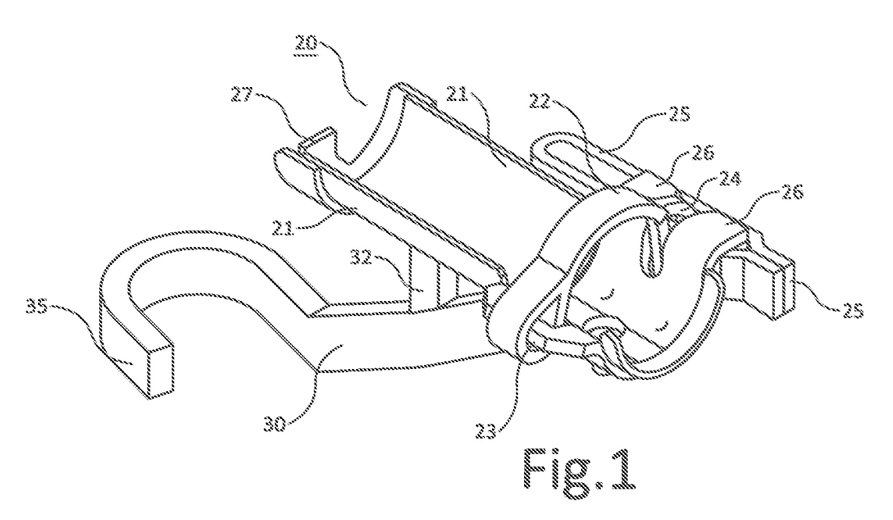
FIG. 1 shows in perspective an exemplary embodiment of a coupling device according to the invention in a situation where it is not yet mounted.

Shown in FIG. 1 is an exemplary embodiment of a coupling device such as can be applied within the context of the present invention. The coupling device comprises on the one hand a base part 20 which can be connected temporarily to a ledger element 10 of a scaffolding. Use is made in this case of a scaffolding constructed from tubular ledgers and uprights. Use is made for this purpose of thick-walled steel or aluminium with an external diameter in the order of 50 millimetres. An internal dimension and contour of base part 20 is adapted hereto so that base part 20 can be arranged tightly and in at least substantially play-free manner on a body section 15 of ledger element 10.

Figure 2:
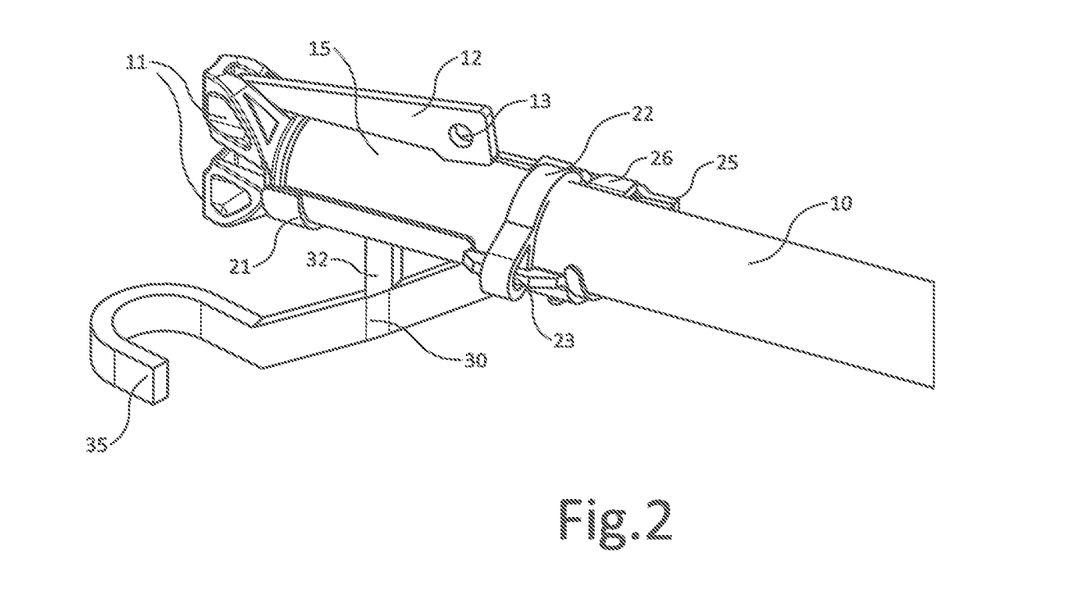
FIG. 2 shows the coupling device of FIG. 1 connected to a ledger element of a scaffolding according to the invention.

Base part 20 comprises for this purpose a set of mutually pivoting parts 21,22. A first of these forms a shell part 21 in which a body section 15 at a distal end of ledger element 10 will be received. A second part of base part 20 of the coupling device forms a pivoting latch 22 which spans the body section while pivoting in a hinge 23 between shell part 21 and latch 22. Latch 22 is provided on an outer end with an eye 24 which drops between a set of hooks 26 extending from shell part 21. In the shown closed situation these eyes 24 and hooks 26 lie mutually in line and a fastener 25 of closing means 25 can be inserted therebehind which locks the different parts 21, 22 in the mutually closed state. The coupling device spans the distal end 15 of the associated ledger element 10 as shown in FIG. 2.

Ledger element 10 is provided at both a proximal end and distal end 15 with a first coupling member 11 of primary coupling means which is connected non-releasably to the respective outer end. This first coupling member here comprises an open coupling jaw 11 which can be pushed over a coupling collar of a series of corresponding second coupling members extending from the uprights. A primary coupling can thus be brought about to these latter complementary coupling means extending from an upright of the scaffolding, as will be further illustrated below. A wedge 12 pivotable in the upper half of coupling jaw 11 and having a lifting eye 13 formed therein serves to lock this primary coupling. A fixing protrusion 27 on the outer end of the coupling device comes up against the end surface of ledger element 10 and drops precisely into coupling jaw 11, whereby coupling device 20, 30 is correctly positioned and aligned both axially and radially.

The coupling device also comprises a coupling part 30 which extends from base part 20 and which, at the distal end of the ledger, engages above or below this primary coupling round the same upright 5. Formed for this purpose on coupling part 30 is a third coupling member in the form of a hook 35 with an internal contour in which a body section of the upright element can be received. In this example, wherein use is made of tube parts with an external diameter of about 50 millimetres for both the ledgers and the upright, hook 35 has the same shape and diameter internally. The coupling device is manufactured wholly from thick-walled steel or aluminium. A strut 32 between base part 20 and coupling part 30 imparts extra stability and strength.

Successive stages of a method for erecting a scaffolding, wherein use is made of the coupling device of FIG. 1, are shown in FIGS. 3a to 3j. The scaffolding comprises a system of uprights 5 and ledgers 10 which mutually enclose a matrix of scaffold sections 7. Ledgers 10 at the bottom and top of a scaffold section serve to support scaffold floor parts, while from a height about halfway therebetween which is no longer safe intermediate ledgers are provided which form a railing so that it is possible to work safely from any scaffold section 7.

During the erection of such a scaffolding the uprights are placed at regular distances from each other and anchored to the fixed world, such as for instance an outer wall of a building. Ledgers 10 are mounted between uprights 5, wherein primary quick-connect members 11 on each of their outer ends are placed over corresponding quick-connect members 9 on the uprights. The coupling members on the outer ends of the ledgers here comprise at each outer end a coupling jaw 11 which is received fittingly over a corresponding coupling collar 9 of a series of such collars extending at a regular pitch from uprights 5. This insert coupling is secured by means of a wedge 12 which extends in pivotable and axially movable manner from coupling jaw 11 and, in the erected position, can be inserted through both sides of coupling jaw 11 as well as an opening in coupling collar 9 and knocked in place in order to thus couple ledger 10 and upright 5 to each other in play-free manner. An intermediate ledger 10 serving as railing is moreover arranged in this manner between successively higher floor levels. An upper ledger 10 at the top can serve as fall protection to which a worker can secure him/herself using a lifeline and his/her fall protection harness.

Figure 3A:
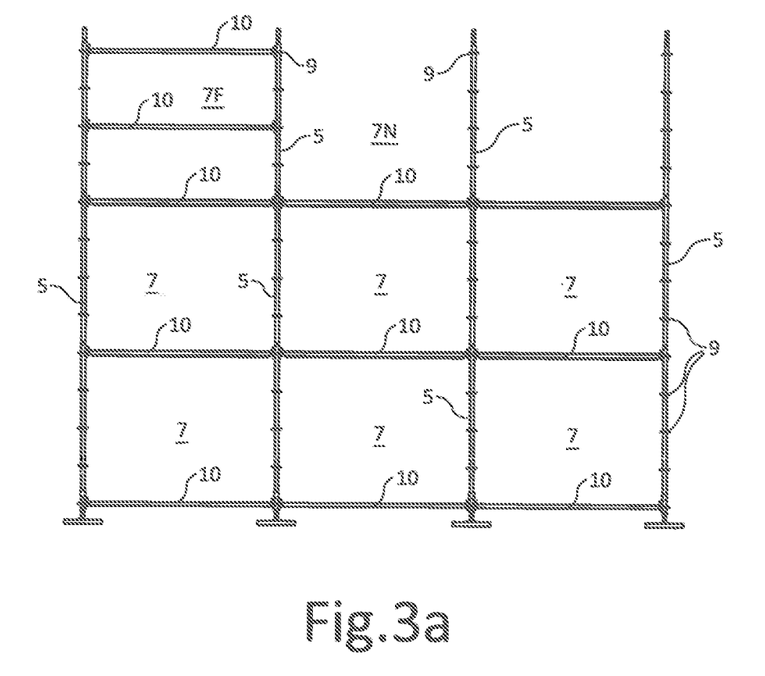
FIGS. 3a-3j show an exemplary embodiment of the method according to the invention at successive stages, making use of the coupling device of FIG. 1.
Figure 3B:
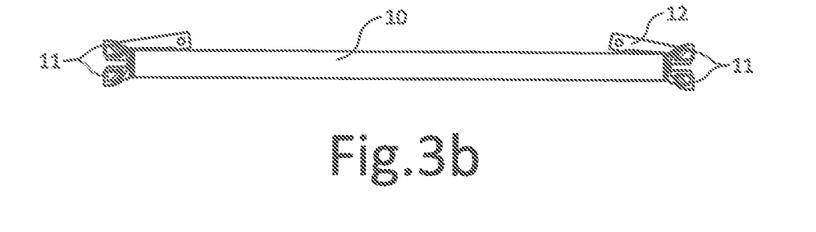
Figure 3C:
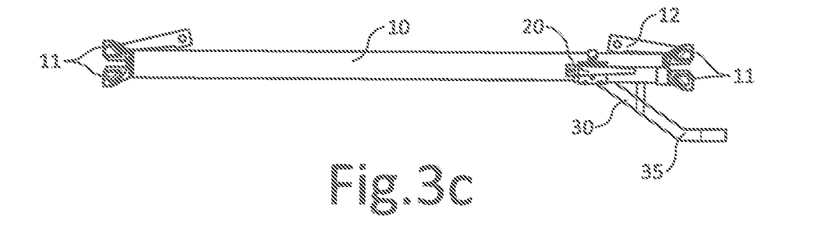
Figure 3D:
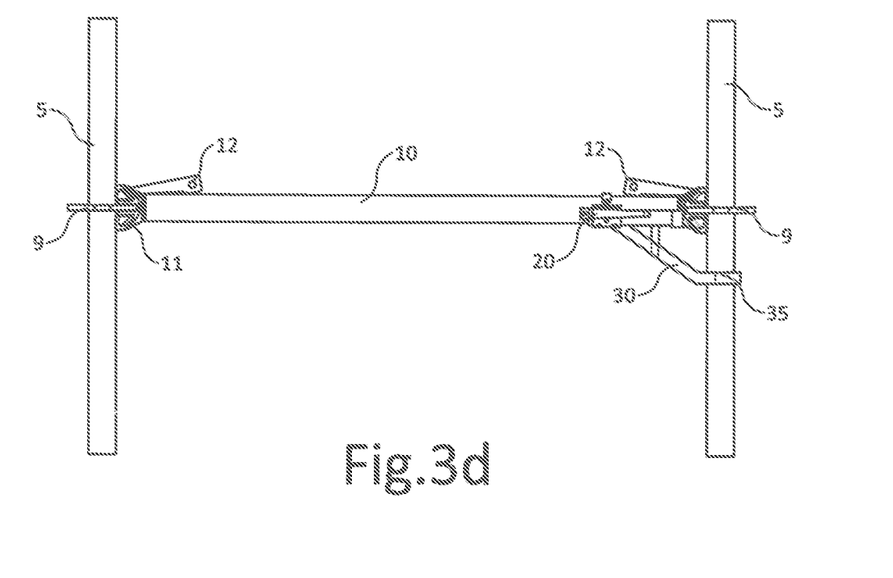

When the scaffolding is being erected these latter safety precautions are however not yet available in each successive scaffold section 7F to be added, see FIG. 3a. In order to nevertheless also create a safe working environment here when an upper ledger 10 is arranged there, the respective ledger 10, see FIG. 3b, is provided at a distal end with the coupling device 20 shown in FIG. 1, see FIG. 3c. This is attached thereto in the manner shown in FIG. 2. These operations can already have been performed before entering the scaffold section 7N to be erected.

Ledger 10 is subsequently manoeuvred by a scaffolder from the safe, previous, last realized scaffold section 7F with the distal end to the subsequent upright 5. Hook 35 of coupling device 20 here spans the subsequent upright 5 while coupling jaw 11 at the distal end of ledger is placed over coupling collar 9 of upright 5, see FIG. 3d. Coupling jaw 11 at the proximal end is then also placed over coupling collar 9 on the proximal upright, this likewise being shown in FIG. 3d.

Figure 3E:
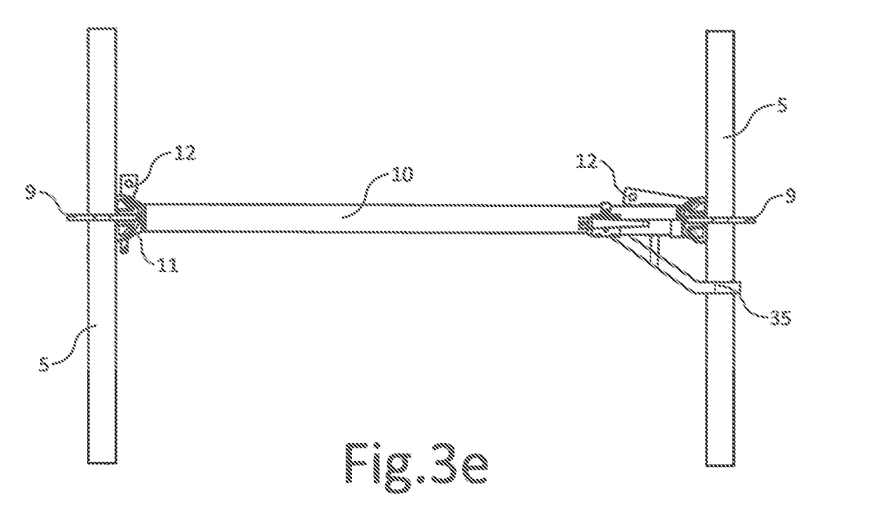
Figure 3F:
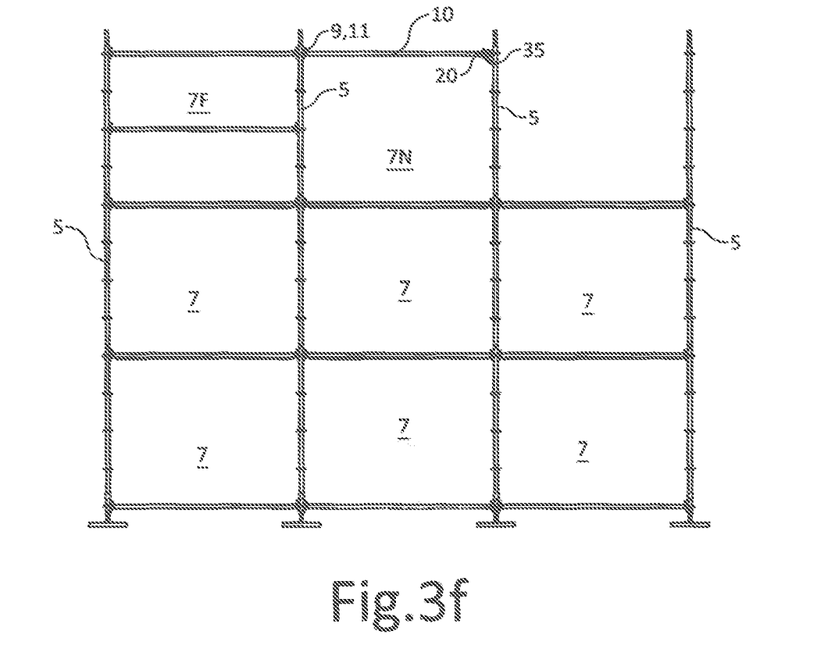
Figure 3G:
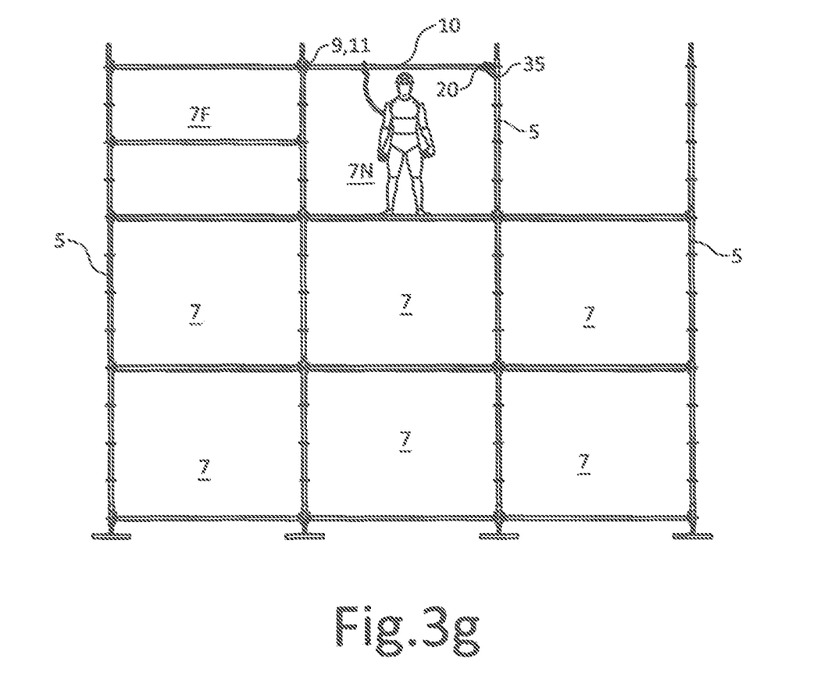

This proximal coupling between ledger and upright can be secured from the previous scaffold section 7 F using wedge 12, see FIG. 3e. The situation thus reached is shown in FIG. 3f. In this situation the upper ledger 10 is enclosed between the adjacent uprights, although the distal primary coupling on the distal side is not yet complete because wedge 12 has not yet been inserted there. Nevertheless, because of hook 35 of coupling device 20, the secondary coupling also provides distally for a temporary locking of upper ledger 10 so that a scaffolder can nonetheless move safely therealong by securing him/herself to upper ledger 10, see FIG. 3g.

Figure 3H:
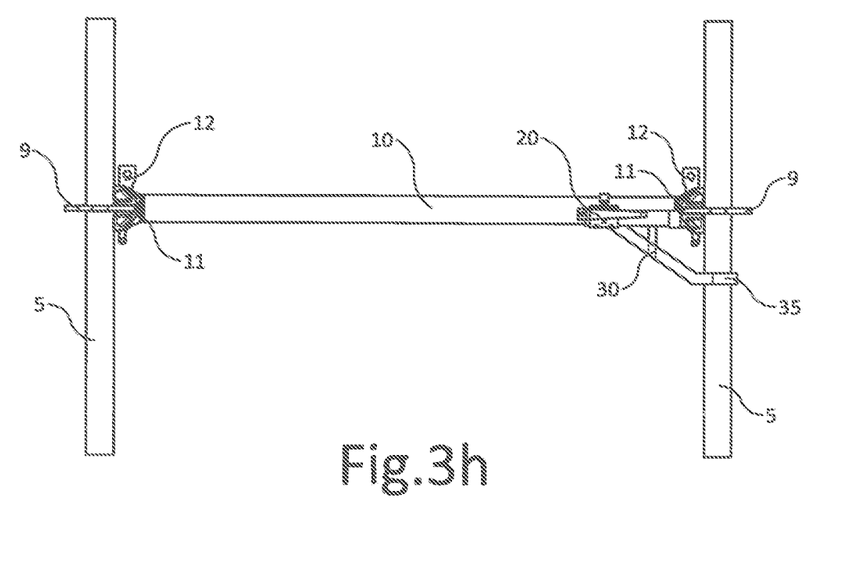
Figure 3I:
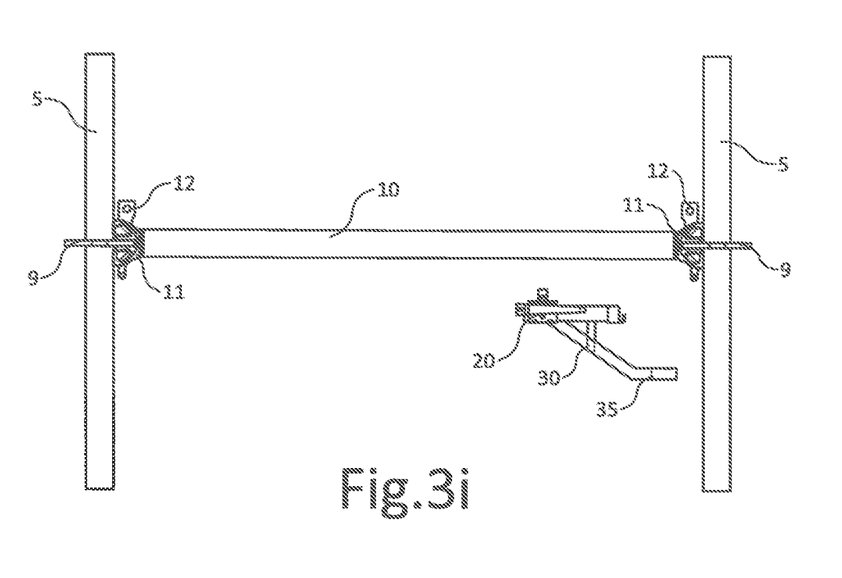
Figure 3J:
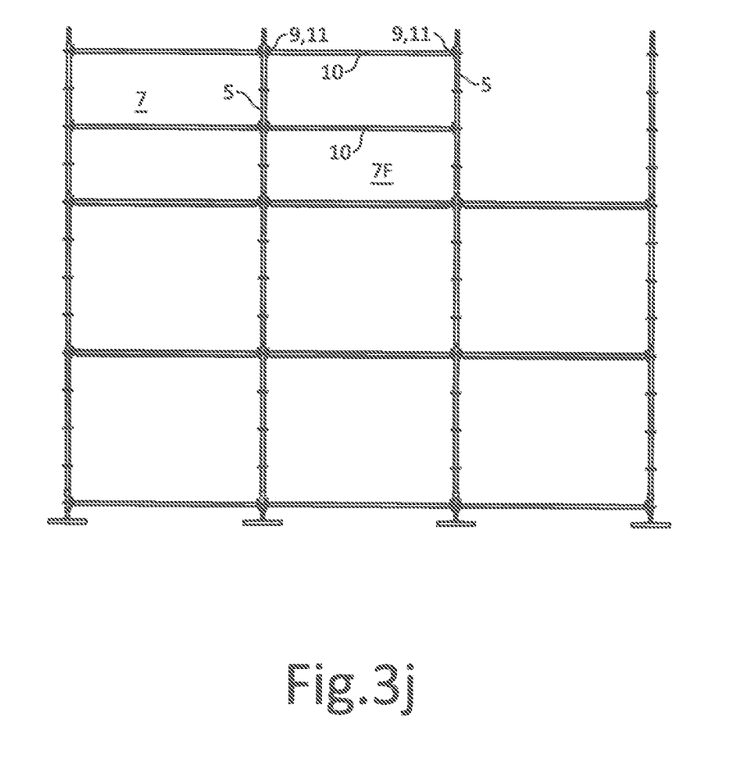

Having once arrived at the distal end of the ledger, the scaffolder places the wedge 12 in order to also distally secure, and thus complete, the primary coupling between ledger 10 and adjacent upright 5, see FIG. 3h. The (temporary) coupling device 20 can then be removed, see FIG. 3i. Secured to the upper ledger, the intermediate ledger 10 can also be arranged in a safe manner without needing to use the coupling device for this purpose, so that finally the construction of FIG. 3j is obtained. The coupling device 20 used herefor can now be utilized in similar manner for the subsequent scaffold section, which can in turn also be erected safely in the same way.

Although the invention has been further elucidated above with reference to only a single exemplary embodiment, it will be apparent that the invention is by no means limited thereto. On the contrary, many more variations and embodiments are possible within the scope of the invention for a person with ordinary skill in the art. Use is thus made in the embodiment of a coupling jaw and coupling collar as primary coupling means, although use can also be made for this purpose of other coupling means such as are usual in system scaffolds. Use is also made in the figures of a (temporary) coupling device with a hook member which engages round a subsequent upright in order to make the (temporary) secondary connection. Use can however be made instead of a different coupling, for instance by means of a hook or fork which engages at another point on the upright, particularly for instance in a coupling member extending therefrom.

The invention claimed is:

1. A scaffolding comprising:
a system of upright elements and ledger elements, wherein the ledger elements extend in a transverse direction between successive upright elements, wherein the ledger elements are provided at opposite outer ends with a first coupling member, wherein the upright elements are provided with second coupling members that are complementary to the first coupling member, wherein the first coupling member of at least one ledger cooperates with the second coupling member on successive upright elements, thereby establishing first connections at the opposite outer ends between the ledger element and the pair of successive upright elements, wherein the ledger elements are provided at a distal end of the opposite outer ends with a detachable coupling device comprising a base part which is connected detachably to a body portion of the ledger element and comprising a coupling part with a coupling member extending from the base part and configured to engage one of the successive upright elements thereby establishing a second connection therewith.

2. The scaffolding of claim 1, wherein the coupling device further comprises a hook extending from the base part, which engages around a body portion of the one of the first and second upright element which extending from the base part.

3. The scaffolding of claim 1, wherein the base part comprises a set of mutually pivoting parts configured to be manipulated manually from an open state to a mutually closed state in which in the closed state the body portion of the ledger element lies enclosed therebetween.

4. The scaffolding of claim 3, wherein the base part comprises a shell part in which the body portion of the ledger element fits, and wherein a latch is connected pivotally to the shell part and closes over the body portion of the ledger element on a side remote from the shell part.

5. The scaffolding of claim 4, wherein the latch is provided with closing means which fix the latch in a closed state.

6. The scaffolding of claim 1, wherein the coupling device comprises a strut which imposes a predetermined relative position on the coupling device and the ledger element.

* * * * *